Patented May 9, 1939

2,157,698

UNITED STATES PATENT OFFICE 2,157,698

ASPHALT EMULSIONS AND PROCESS OF MAKING SAME

Arthur Ludwick Halvorsen, Staten Island, N. Y.

No Drawing. Application December 27, 1934, Serial No. 759,371

20 Claims. (Cl. 134—1)

This invention relates to asphalt emulsions and similar dispersions and has for an object the provision of an improved asphalt emulsion and process of making the same.

The asphalt dispersions of commerce consist of mixtures of asphalt, water and various protective agents which serve to maintain, and in many cases also to effect, dispersion. These dispersions may in general be roughly classified into two groups possessing characteristically different properties: the first, comprising those in which substances other than colloidal clay and highly swelling paste-like substances serve as the dispersive and protective agents, for example, fatty acid soaps and alkalides; and the second, those which utilize swelling colloidal clay or other hydrated mineral colloids, or swelling organic agents such as casein and other proteins, starches, etc., for such purpose.

In general, asphalt dispersions or emulsions in the first category are either free-flowing, or more or less viscous, as distinguished from flow-resistant or plastic. They tend to coalesce very readily and are rather sensitive to various influences frequently encountered in general use which tend to coagulate or "break" and otherwise adversely affect the emulsion. Their characteristics adapt varieties of these emulsions for such general uses as concrete curing, certain cases of masonry damp-proofing and especially as "binders" in road-surfacing and cold-patch road repair work.

On the other hand, these same characteristics render this type of emulsion unsuitable in numerous applications, one example of which is in the provision of the relatively thick coatings desired for the protection of metal structures, especially where the exposure to moisture and corrosive agents is severe. When used in the form of thick coatings, their tendency to coalesce readily, generally results in the rapid formation of a dried and coalesced film at the exposed surface which entraps the unevaporated water therebeneath and results in poor adherence of the coating to the metal or other surface. Their tendency to slowly yield and flow, much in the manner of pure asphalt, presents a further limitation in this and other applications which becomes even more pronounced where the emulsion will be subjected to other than moderately low temperatures. An additional restricting factor is the objectionable sensitivity of these emulsions, which prohibits their exposure to various adverse influences, for example, emulsion breaking electrolytes, acids and many solids.

As regards asphalt dispersions in the second category, the best known being the so-called clay emulsions, which are more of the order of suspensions than true emulsions, they are generally characterized by their non-coalescence, their plastic or flow-resistant nature and their relative non-sensitivity to the usual emulsion-breaking and similar injurious influences. These properties of the clay type of emulsions render them much better adaptable than the non-clay type for use where thick protective coatings are desired, and where admixture with, or other exposure to, materials or influences which are antagonistic to the non-clay type is necessary. However, while the non-coalescent character of this type of emulsion eliminates the matter of non-uniform drying associated with non-clay emulsions because of premature surface coalescence, it also inherently results in injury to the adhesive and cohesive strength of the coating. Because of this non-coalescence of the particles, the coating dries to a porous or cellular structure, and subsequent reabsorption of water upon exposure thereto results in reduction in the degree of cohesion of the particles and adhesion to the coated surface. This objection is particularly pronounced when the emulsion is used as a protective coating for structures submerged in water.

In my copending application, Serial No. 309,360, now Patent No. 1,995,346, issued March 26, 1935, I have described a process for making an asphalt emulsion which possesses the desirable qualities of stability and insensitiveness of the clay-type emulsions, but is made without the use of pasty or swelling agents. In this process a primary asphalt-water emulsion of alkaline reaction is prepared through the medium of a small amount of non-pasty, non-swelling, alkaline-reacting alkali metal compound, and then the said alkaline emulsion is subjected to the action of a small amount of feebly acidic substance, whereby a plastic, coalescent, stable and insensitive emulsion of acid reaction is obtained.

In applying this particular kind of asphalt emulsion to new uses, I found differences in behavior among the various emulsions which I made in accordance with the process above referred to, such differences being in degree, however, rather than in kind. I found that a degree of covering of the asphalt particles by small amounts of salts or oxides, etc., as formed, in some cases, in the course of the process, or even by small amounts of colloids presumably present as impurities in impure tannins, if such were used, was not necessarily rendered entirely harmless by the evaporation of the water of the applied emulsion at atmospheric temperature, and could tend in varying degrees to hinder or retard the complete coalescence of the asphalt particles into a continuous protective coat or sheet of asphalt. By adopting the one procedure of using $Na_3PO_4$ as the alkaline agent, a chemically pure, completely soluble, tannic acid (U. S. P.), and a small amount of $FeSO_4$, I obtained the best results in the practical operation of my previous invention. In some cases, however, the precipitates incidentally formed in the emulsions of my previous invention may be undesirable, and I have found it possible to prepare emulsions which do not appear to contain any precipitates, and which may be advantageous for some purposes.

The present invention is an improvement on my previous invention, as described above, and comprises the use of substances which do not appear to form precipitates or deposits of any kind with such other substances as have been used in the emulsion. The advantages of this type of emulsion will be pointed out more fully hereinafter.

In accordance with the invention, I use water solutions of tannic, boric, citric, oxalic acids, etc., either alone or with their alkali metal salts, to "immunize" a sensitive emulsion, such as has been made with a minimum of non-swelling, alkaline-reacting alkali metal salts, against other acid substances, electrolytes and solids such as would normally break the sensitive emulsion. It was found that the acid or substance first introduced should be only extremely mildly ionized and approach, in behavior, perhaps, more or less singly dissolved free molecules, neither appreciably joined into colloidal aggregates nor appreciably dissociated into ions. Chemically pure tannic acid typifies this condition perhaps more nearly than any other acid or substance. Furthermore, its already very feebly active reserve of acidity is presumably greatly diffused in the relatively large tannic acid molecule, in the form of a number of very feeble acidic groups. Its mild activity is thereby additionally softened. Then, after the inital addition of the very weak acid, the stronger, although still comparatively weak, acids may be added.

True emulsions, in the absence of pasty, swollen, and more or less corporeal stabilizing substances, are, it is believed, greatly dependent upon mutually repellent electric charges on the dispersed phase particles as a major condition for stability. Alkaline emulsions will normally have negative charges, through the influence of a preponderance of hydroxyl ions. To change an alkaline emulsion into an acid one, without having recourse to pasty or bodily protective agents, involves the danger of breaking the emulsion and is a difficult operation. The acid or acid substances used for the purposes should have an available excess or reserve of hydrogen ions. At one stage in the change these positive ions will have effected a discharge of the negative charges of the alkaline emulsions without a substitute having, as yet, been provided to take their place as a major support for the stability of the emulsion. In the approach to, and at this intermediate stage, the emulsion is in the immediate danger of breaking and is not stable. Once the change has been safely effected and a much less sensitive acid emulsion has been established, the danger of breaking has been greatly reduced, and for most practical purposes has been removed.

It would seem more logical to make a desired acid emulsion to start with, instead of depending on a change from an alkaline to an acid emulsion, which is at best very difficult and hazardous without having recourse to the pasty, highly swelling or bodily, so-termed protective, colloidal substances. Due, however, to emulsification factors other than electric charges, especially surface tension and interfacial relationships, it is usually far easier to make an alkaline than an acid emulsion. As a matter of fact, my work so far has shown that emulsification under conditions as existing in my finished acid emulsion is not practicable.

This latter fact is an important advantage of my emulsion, for the reason that it excludes all possibility of re-emulsification of the dried coating when exposed to water. In colloidal clay type emulsions, on the other hand, the original dominant swelling emulsifying agents exist in the dried coating as potential emulsifying agents, ready to re-assert themselves upon contact with water, and in many cases in which the colloidal clay content exceeds a critical range re-emulsification will take place, even at ordinary atmospheric temperatures, and the coating may actually be washed away. In other cases, where the use of colloidal clay has been kept down strictly to the least possible amount consistent with satisfactory stability and emulsification, the tendency to re-emulsify will exhibit itself, to a less severe extent, by reduced protective value, loss of bond to the coated surface, and reduced cohesive strength of the coating itself as water re-enters upon exposure thereto.

In accordance with the present invention, I effect the emulsification initially by very limited amounts of trisodium phosphate or other non-swelling, alkaline-reacting alkali metal compounds. The emulsification proceeds freely, with a minimum of bodily envelope resistance being exerted against repeated subdivision of already dispersed asphalt particles, while mutually repellent negative charges prevent reunion of such particles and compensate for a deficiency in physical envelope strength. In this way a perfect, extremely fine, but sensitive emulsion results. It is stable in regard to time, but is especially sensitive in regard to any conditions tending to interfere with its negative charges, such as opposing positive charges, either static or ionic, and electrolytically conductive salts.

In practice, in subjecting this alkaline, sensitive emulsion to the hazardous change from alkalinity to acidity, I usually prefer first to mix a quantity of the same in the correct ratio into a quantity of the mildest of the acids to be used, such acid having been previously diluted with water to a predetermined, safe degree of concentration, such as will not break the emulsion. From then on the alkaline sensitive emulsion and the mildest acid of the requisite concentration (which may be stronger than the initial concentration, if desired) are fed continuously or semi-continuously into this mixture at accurately measured rates, and the so-mixed intermediate product is simultaneously withdrawn at a corresponding rate so as always to maintain a certain reserve in the intermediate mixer to act immediately as a diluting medium for the acid which might otherwise break the emulsion. Finally I feed and mix into the intermediate product, as it is being withdrawn, the requisite quantity of one or more of the stronger acids, to establish the emulsion definitely on the acid side. The acids are so chosen, with respect to the other constituents of the emulsion, as not to form precipitates or deposits in the emulsion.

It should be noted that the intermediate product, having received only the mildest acid treatment (tannic acid, for example), is not stable, and usually will not keep for more than a relatively short time, varying perhaps from a few minutes, only, to a few days or weeks. Therefore, once the stable, but sensitive, primary alkaline emulsion has been subjected to the mildest acid treatment, it is preferable that this be followed with the final stronger acids in a more or less continuous operation, as indicated.

I may vary the procedure by using first an alkali metal salt of the mildest acid, mixing the same with the primary alkaline emulsion, and either follow this with an addition of the mildest acid itself and then with the addition of one of the stronger acids, or directly with the addition of one of the stronger acids. In either case, a correspondingly larger quantity of total acid has to be used to fix the additional alkali metal so as to free its equivalent of mild acid, and for this reason it is generally preferable to use the acid rather than its salt when this is otherwise feasible.

The following examples serve to illustrate my invention:

I

Using for example Venezuelan asphalt having the following characteristics:

| | |
|---|---|
| Penetration at 77° F | 102 |
| Loss on heating 50 gms. 5 hrs. 325° F. per cent | 0.3 |
| Penetration at 77° F. of residue left above | 88 |
| Sample evaporated to 53 penetration, ductility at 77° F centimeters | 100 |
| Bitumen soluble in carbon disulphide per cent | 99.9 |
| Bitumen soluble in ether per cent | 85.5 |
| Penetration at 100° F per cent | 242 | a primary emulsion of alkaline reaction is first made by feeding 3500 pounds of the asphalt, at about 110° C., into 1750 pounds of water at 100° C., in which 25 pounds of trisodium phosphate crystals have been dissolved, the addition of the asphalt being accompanied by thorough agitation. The amount of trisodium phosphate used should be very small, for if used in material amounts either inferior or nonemulsification of the asphalt will be obtained. In the above, for example, $Na_3PO_4$ constitutes approximately 0.2% of the total weight of the emulsion.

The alkaline emulsion obtained as above described is then admixed at room temperature first with a dilute solution, e. g. 3.5%–5%, of tannic acid in water, and subsequently with dilute water solutions, e. g. 5%, of boric acid and 10% of citric acid, successively, in such proportions that the tannic acid will be provided in the proportion of approximately 0.35%–0.5% of the total weight of the emulsion, the boric acid approximately 0.1%–0.3% and the citric acid 0.3%–0.35%.

The acid emulsion which results is very stable and insensitive to the ordinary emulsion-breaking agents, and possesses the ability to coalesce in such a manner as to permit practically uniform drying. Also, the constituents used do not form deleterious precipitates or deposits to adversely affect the emulsion.

II

A primary alkaline emulsion is made by mixing 2000 parts by weight of Mexican asphalt, at about 115° C., into 1350 parts of water, at about 95° C., in which trisodium phosphate and ammonia have been dissolved in such amounts as to constitute approximately 0.2% $Na_3PO_4$ and 0.01% $NH_3$ when estimated on the total weight of the emulsion. As in the case of the Example I, the $Na_3PO_4$ should be used in only very slight amount, and the same is true of the ammonia.

This primary alkaline emulsion is then admixed at room temperature with a 5% water solution of tannic acid, and thereafter with a 5% water solution of citric acid, the tannic acid and citric acid being used in such proportions as to constitute 0.35%–0.5% and 0.2%–0.4% respectively of the weight of the emulsion, whereby the novel acid emulsion of my invention is obtained.

III

The primary emulsion may also be made by a very small amount of caustic alkali, e. g. 0.05%–0.10% of $Na_2O$ or its equivalent in conjunction with the asphalt and water, which emulsion is thereafter admixed with a 1½%–2% water solution of chemically pure tannic acid, and with a 5% solution of boric acid and a 10% solution of tartaric acid, successively, to provide the novel acid emulsion of my invention. A representative set of proportions in which the constituents may be satisfactorily used, based on the total weight, is approximately as follows: asphalt 43%; $Na_2O$=0.08%; tannic acid 0.35%; boric acid 0.2%; tartaric acid 0.3% (the remainder being water).

The emulsion obtained is of the same nature as those prepared in Examples I and II, but is more fluid due to the much lower asphalt content and the correspondingly higher water content of the present emulsion.

It may also be observed that a weaker tannic acid solution has been used in the present case. This has been done to safeguard the unusually sensitive emulsion against breaking during the acid treatment which is effected with more difficulty when the primary emulsion has been made with bare caustic alkali, instead of with the trisodium phosphate as in Examples I and II, in which cases the gentleness of action desired of the acidifying treatment may have been facilitated and aided through a "buffer" action of the salt.

IV

A primary alkaline emulsion is first prepared from 650 parts by weight of a Venezuelan asphalt and 350 parts of water in which 6 parts of crystalline trisodium phosphate has been dissolved.

The acid emulsion of my invention is then obtained by first admixing 400 parts by weight of the primary emulsion with 50 parts of a 4% water solution of tannic acid, and then adding thereto, successively, 30 parts of a 3.5% water solution of boric acid and 35 parts of a 3.5% water solution of oxalic acid.

As in previous cases the mildly alkaline trisodium phosphate and the very feebly acidic tannic acid, as well as the boric acid and oxalic acid, should be used in relatively slight amounts, in this instance approximately 0.2% $Na_3PO_4$, 0.4% tannic acid, 0.2% boric acid and 0.25% oxalic acid.

V

Using a Trinidad residual oil asphalt having the following characteristics:

| | |
|---|---:|
| Sp. gr. at 60° F. | 1.019 |
| R and B melt. point_____°F_ | 105 |
| Penetration 77° F. | 179 |
| Penetration 32° F. | 24 |
| Penetration 115° F. | too soft |
| Ductility at 77° F._____cms_ | 100+ |
| Viscosity furol 200° F._____secs._ | 780 |
| Viscosity furol 250° F. | 134 |
| Viscosity furol 300° F. | 36 |
| Flash-open cup_____°F_ | 530 |
| Solubility in $CS_2$_____percent_ | 99.9 |
| Solubility 86° naphtha | 88.7 |
| Fixed carbon | 8.62 |
| Loss 50 gms. 5 hrs. 325° F. | 0.06 |
| Penetration on residue 77° F. | 155 | a primary emulsion of alkaline reaction is first made according to the following formula:

| | |
|---|---:|
| Trisodium phosphate crystals___pounds_ | 2.09 |
| Water _____do__ | 133.0 |
| Asphalt _____do__ | 187.0 |
| Temperature of water_____°F_ | 140 |
| Temperature of asphalt_____°F_ | 240 |
| Temperature put in drum_____°F_ | 80 |

Using this primary emulsion, the following emulsion is made, the procedure being to put the tannic acid in the mixer, add the primary emulsion, mix thoroughly, and then add the stronger acidic stabilizing agents in the order named:

| | Pounds |
|---|---:|
| 4% tannic acid | 5.00 |
| Primary emulsion | 40.00 |
| 3.5% boric acid | 5.00 |
| 10% oxalic acid | 1.65 |
| 10% NaOH to adjust H ion concentration to pH4 | 0.45 |

The foregoing specific procedures are intended merely to be illustrative and may be subjected in practice to such changes as are necessitated by the particular operation involved, the character of the asphalt used, and other considerations which will be apparent to one skilled in the art. Other primary emulsifying agents which may be used in place of the trisodium phosphate or the caustic soda are, for example, the equivalent potassium compounds, and such combinations of the alkali metals as will provide the desired degree of effective alkalinity. Other acidic substances may also be used such as pyrogallic acid as a substitute for the tannic acid. For the stronger acidic substances, acids other than those given in the examples may be used, so long as they are soluble, will not form precipitates with the other constituents of the emulsion, and will not break the emulsion, or salts or combinations of these acids which either possess the desired degree of acidic activity or to which such acidic activity may be imparted, for example, by stronger acids, or by milder qualifying agents such as salts having a determined "buffer" action, as the case may require. Inert fillers, where such are desired, may be incorporated in the finished emulsion.

As noted hereinbefore, the primary coalescent emulsion is first prepared in an alkaline condition, and this emulsion is then subjected to the action of certain soluble and non-precipitant acidic substances which do not form undesired precipitates with other constituents of the mixture, in a manner to produce a carefully controlled passage from the alkaline to an acid state. The most suitable conditions of alkalinity and acidity may vary in each particular case, but in general are characterized as follows:

(1) The primary alkaline emulsion has a pH, determined colorimetrically of the order of 9.

(2) Upon the controlled treatment with the feebly acidic substance of a certain character, e. g. the tannic acid, the pH is lowered to substantially the neutral point, or substantially pH 7, and (3) Thereafter, by the addition of stronger acidic agents, the pH is carried definitely to the acid side for the production of the final emulsion, to a point not lower than substantially pH 3.5.

While proper pH control is an essential guide in the production of the emulsion, the nature of the materials used is as well of importance. The exact action of the tannic, boric and stronger acids, $Na_3PO_4$, etc., is indeterminate practically and equally difficult to explain. One possible hypothesis is that concurrently with the change in the character of the emulsion which results in the non-sensitiveness, the use of these dissolved, non-precipitant materials, under the conditions noted, provides an absorbed or "alloyed" medium, possibly of more or less molecular dimensions only, on the asphalt particles, which medium has become immunized, or serves to immunize, in so far as breaking of the emulsion is concerned, the dispersed asphalt against the effect of electrolytes, acids, alkalies and similar influences. Possibly a form of accelerated "case-hardening" or surface alloying of the asphalt particles themselves, perhaps to more or less molecular depth only, is a contributory or even a major cause for the insensitivity. Considerable support for such hypothesis is indicated by the marked lowering in penetration, easily from 120 in the initially emulsified asphalt to 60 in the acid emulsion asphalt in many cases. While such hardening naturally appears to be uniform throughout the body of asphalt as prepared and tested for penetration, it may well have been originally, in the acid emulsion itself, a highly intensified surface effect traceable to the outer part or "case" only of each minute particle. A uniform hardening from 120 penetration to 60 would probably not assist appreciably towards insensitivity, but a similar mean hardening, if assignable only to an outer case of minute depth, could quite conceivably be present so as to be a cause of insensitivity.

Regardless of the exact nature of what may occur and of the action which actually takes place, however, this insensitivity is effected in the absence of all recognized stabilizing agents, such as casein and other proteins, starches, gums, colloidal clay such as "Bentonite", and metallic oxide gels or hydrates and similar finely divided or colloidal organic or inorganic substances. Once an acid emulsion has been obtained in the carefully controlled manner noted, it can be subjected to very rigorous treatment without breaking. For example, sulphuric, hydrochloric and other strong acids can be added to the emulsion in reasonable concentrations without breaking it, and similarly NaOH, $NH_4OH$ and $Ca(OH)_2$, as well as Na₂SO₄, NaCl, CaCl₂, MgCl₂ and various other electrolytes.

I claim:

1. In a process of making an acid-reacting asphalt emulsion which comprises preparing a primary asphalt-water emulsion through the medium of a small quantity of non-pasty, non-swelling, alkaline-reacting compound and then subjecting said alkaline emulsion to the action of a small quantity of feebly acidic substance, the improvement which comprises utilizing for said acidic substance feebly acidic, substantially non-precipitant substance whereby a coalescent acid-reacting emulsion may be obtained without the presence of undesired precipitates.

2. In a process of making an acid-reacting asphalt emulsion which comprises preparing a primary asphalt-water emulsion by the addition of a small quantity of non-pasty, non-swelling, alkaline-reacting alkali metal compound, and then admixing with said emulsion small quantities of successively stronger weakly acidic substances to obtain an acid emulsion, the improvement which comprises utilizing for said acidic substances weakly acidic, substantially non-precipitant substances whereby a coalescent acid-reacting emulsion may be obtained without the presence of undesired precipitates.

3. The process of making asphalt emulsions which comprises preparing an alkaline-reacting asphalt-water emulsion by the addition of a small quantity of alkali metal compound to provide a pH of not less than of the order of 9, then admixing with the emulsion so obtained a small quantity of weakly acidic non-precipitant substance to obtain an emulsion having a pH of substantially 7, and then further increasing the hydrogen ion concentration of said emulsion to between pH 7 and pH 3.5 by the addition of slightly stronger, weakly acidic, substantially non-precipitant substance, whereby a coalescent acid-reacting emulsion may be obtained without the presence of undesired precipitates.

4. The process of making asphalt emulsions which comprises dispersing asphalt in water in the presence of a small quantity of non-pasty, non-swelling, alkaline-reacting alkali metal compound to provide an emulsion having a pH not less than of the order of 9, and then admixing with said emulsion a small quantity of weakly acidic non-precipitant substance to change the hydrogen ion concentration to between pH 7 and pH 3.5, whereby an acid-reacting emulsion may be obtained without the presence of undesired precipitates.

5. The process of making asphalt emulsions which comprises dispersing asphalt in water in the presence of a small quantity of trisodium phosphate to obtain an emulsion having a hydrogen ion concentration corresponding to a pH reading of not substantially less than 9, admixing with said emulsion a small quantity of tannic acid to obtain an emulsion having a hydrogen ion concentration of substantially pH7, and admixing with said last named emulsion a small quantity of weakly acidic, non-precipitant substance of the group: boric acid, citric acid, oxalic acid, tartaric acid, to obtain a hydrogen ion concentration between pH7 and pH 3.5.

6. The process of making asphalt emulsions which comprises dispersing asphalt in water in the presence of a small quantity of a compound having an alkali metal cation and an anion of the group: tribasic phosphate, hydroxyl, tannate, to obtain an emulsion having a hydrogen ion concentration corresponding to a pH reading of not substantially less than 9, admixing with the alkaline emulsion so obtained an acid phenolic substance of the nature of tannic acid, pyrogallic acid to obtain an emulsion having a hydrogen ion concentration of substantially pH7, and admixing with said last named emulsion at least one acid of the group: boric acid, oxalic acid, citric acid, tartaric acid to obtain an emulsion having a hydrogen ion concentration between pH7 and pH 3.5.

7. The process of making asphalt emulsions which comprises dispersing asphalt in water containing an alkali metal compound in quantity sufficient to produce an emulsion having a pH of not substantially less than 9, admixing with said emulsion a small quantity of tannic acid to obtain an emulsion having a pH of substantially 7, and adding to said last named emulsion at least one acid of the group: boric acid, citric acid, oxalic acid, tartaric acid, to obtain an emulsion having a pH between 7 and 3.5.

8. The process of making asphalt emulsions which comprises dispersing asphalt in water containing a compound having an alkali metal cation and an anion of the group: tribasic phosphate, hydrate in quantity constituting approximately 0.04%–1% of the weight of the batch, whereby an alkaline emulsion is obtained, and then converting said alkaline emulsion to an acid emulsion by admixing with said alkaline emulsion first tannic acid and then at least one acid of the group: boric acid, citric acid, oxalic acid, tartaric acid in quantities respectively constituting approximately 0.35%–0.5% and 0.2%–0.65% of the weight of the emulsion.

9. The process of making asphalt emulsions which comprises emulsifying asphalt in water in the presence of a small quantity of alkali metal compound to provide an alkaline emulsion, admixing with said alkaline emulsion a small quantity of tannic acid to obtain a substantially neutral emulsion, and then admixing with said neutral emulsion a small quantity of a weakly acidic non-precipitant substance whereby an acid emulsion is obtained without the formation of undesired precipitates.

10. The process of making asphalt emulsions which comprises emulsifying asphalt in water through the medium of a small quantity of alkali metal salt to provide an emulsion having a hydrogen ion concentration corresponding to a pH reading of the order of 8–10, subjecting said emulsion to the action of an acid phenolic substance of the nature of tannic acid in quantity sufficient to change the hydrogen ion concentration of said emulsion to substantially pH7, and then subjecting said emulsion to the action of substance of the nature of boric acid, citric acid, oxalic acid, tartaric acid, in amount sufficient to provide an emulsion having a hydrogen ion concentration between pH7 and pH 3.5.

11. The process of making asphalt emulsions which comprises dispersing asphalt in water containing a small quantity of alkali metal hydrate whereby an alkaline emulsion is obtained, admixing with said emulsion a small quantity of tannic acid to substantially neutralize the alkalinity, and admixing with the emulsion so obtained a small quantity of at least one of the group: boric acid, citric acid, oxalic acid, tartaric acid to obtain an acid emulsion having a hydrogen ion concentration between pH7 and pH 3.5.

12. The process of making asphalt emulsions which comprises dispersing asphalt in water in the presence of a small quantity of trisodium phosphate to obtain an emulsion having a hydrogen ion concentration corresponding to a pH reading of not substantially less than 9, admixing with said emulsion a small quantity of tannic acid to obtain an emulsion having a hydrogen ion concentration of substantially pH7, and admixing with said last named emulsion a small quantity of boric acid and oxalic acid to obtain a hydrogen ion concentration between pH7 and pH 3.5.

13. The process of making asphalt emulsions which comprises dispersing asphalt in water in the presence of a small quantity of non-pasty, non-swelling, alkaline-reacting alkali metal compound to provide an emulsion having a pH not less than of the order of 9, and then incorporating with said emulsion an acid of the nature of tannic acid, pyrogallic acid to obtain an emulsion having a pH value of substantially 7, and incorporating with said last named emulsion a small quantity of boric acid and at least one acid of the group consisting of citric acid, oxalic acid and tartaric acid, to obtain an emulsion having a pH value between 7 and 3.5.

14. A composition of matter which comprises a stable, homogeneously coalescent emulsion exhibiting substantially no tendency to break when subjected to the influence of acidic or alkaline electrolytes, and composed of asphalt, water, non-pasty non-swelling alkaline-reacting alkali metal compound, and non-pasty non-swelling non-precipitant acidic substance, and having a hydrogen ion concentration of between pH 7 and pH 3.5.

15. The process of making asphalt emulsions which comprises preparing an alkaline-reacting asphalt-water emulsion through the medium of a small quantity of non-pasty, non-swelling, alkaline-reacting alkali metal compound to provide a pH of not less than of the order of 9, adding the emulsion so obtained to a solution of weakly acidic non-precipitant substance to obtain an emulsion having a pH of substantially 7, and then further increasing the hydrogen ion concentration of said emulsion to between pH 7 and pH 3.5 by incorporating therewith slightly stronger, weakly acidic, substantially non-precipitant substance, whereby a coalescent, acid-reacting emulsion may be obtained without the presence of undesired precipitates.

16. The process of making asphalt emulsions which comprises dispersing asphalt in water in the presence of a small quantity of a compound having an alkali metal cation and an anion of the group: tribasic phosphate, hydroxyl, tannate, to obtain an emulsion having a hydrogen ion concentration corresponding to a pH reading of not substantially less than 9, adding alkaline emulsion so obtained to a solution of an acid phenolic substance of the nature of tannic acid, pyrogallic acid to obtain a substantial quantity of an intermediate emulsion having a hydrogen ion concentration of substantially pH 7, gradually adding to said intermediate emulsion as desired further quantities of the said alkaline emulsion and the said acid phenolic substance to obtain more intermediate emulsion, and withdrawing as desired quantities of said intermediate emulsion for further treatment, said further treatment comprising admixing with said intermediate emulsion at least one acid of the group: boric acid, oxalic acid, citric acid, tartaric acid to obtain an emulsion having a hydrogen ion concentration between pH 7 and approximately pH 3.5.

17. The process of making asphalt emulsions which comprises preparing a primary asphalt-water emulsion through the medium of a small quantity of non-pasty, non-swelling, alkaline-reacting alkali metal compound to provide a pH of not less than of the order of 9, adding primary emulsion so obtained to a solution of weakly acidic non-precipitant substance to obtain a substantial quantity of an intermediate emulsion having a pH of substantially 7, gradually adding to said intermediate emulsion as desired further quantities of the said primary emulsion and the said weakly acidic substance to obtain more intermediate emulsion, and withdrawing as desired quantities of said intermediate emulsion for further treatment, said further treatment comprising incorporating with said intermediate emulsion slightly stronger, weakly acidic, substantially non-precipitant substance to obtain a pH value between 7 and approximately 3.5, whereby a coalescent, acid-reacting emulsion may be obtained without the presence of undesired precipitates.

18. In the process of making asphalt emulsions including the steps of preparing a primary alkaline-reacting asphalt-water emulsion through the medium of a small quantity of non-pasty, non-swelling, alkali metal compound, admixing with said alkaline-reacting emulsion a small quantity of feebly acidic substance to form an intermediate emulsion, and subsequently incorporating therewith a small quantity of slightly stronger, weakly acidic, substance to produce a stable acid-reacting emulsion, the improvement which comprises maintaining a substantial quantity of said intermediate emulsion, and incorporating with said substantial quantity additional quantities of the primary emulsion and the feebly acidic substance to make more intermediate emulsion and withdrawing portions of the intermediate emulsion for treatment with the slightly stronger, weakly acidic, substance as desired.

19. In the process of making asphalt emulsions including the steps of preparing a primary alkaline-reacting asphalt-water emulsion through the medium of a small quantity of non-pasty, non-swelling, alkali metal compound, admixing with said alkaline-reacting emulsion a small quantity of feebly acidic substance to form an intermediate emulsion, and subsequently incorporating therewith a small quantity of slightly stronger, weakly acidic, substance to produce a stable acid-reacting emulsion, the improvement which comprises maintaining a substantial quantity of intermediate emulsion which was initially prepared by adding primary emulsion to a solution of the feebly acidic substance, and incorporating with said substantial quantity additional quantities of the primary emulsion and the feebly acidic substance to make more intermediate emulsion and withdrawing portions of the intermediate emulsion for treatment with the slightly stronger, weakly acidic, substance as desired.

20. In the process of making asphalt emulsions comprising emulsifying asphalt in water by admixing therewith a small quantity of non-pasty, non-swelling, alkaline-reacting alkali metal compound to obtain a primary emulsion having a pH value not substantially less than 9, admixing with said primary emulsion a small quantity of a weakly acidic substance to obtain an intermediate emulsion having a pH of substantially 7, and admixing with said intermediate emulsion slightly stronger weakly-acidic substance to obtain a final stable emulsion having a pH value between 7 and approximately 3.5, the improvement which comprises producing and maintaining a substantial quantity of said intermediate emulsion, and incorporating with said substantial quantity additional quantities of primary emulsion and weakly acidic substance to make more intermediate emulsion and withdrawing portions of the intermediate emulsion for treatment to make the final emulsion as desired.

ARTHUR LUDWICK HALVORSEN.